United States Patent [19]

Winter et al.

[11] Patent Number: 5,627,245

[45] Date of Patent: *May 6, 1997

[54] PROCESS FOR THE PREPARATION OF A SYNDIOTACTIC PROPYLENE COPOLYMER

[75] Inventors: Andreas Winter; Volker Dolle, both of Kelkheim; Jürgen Rohrmann; Walter Spaleck, both of Liederbach; Martin Antberg, Hofheim am Taunus, all of Germany

[73] Assignee: Hoechst Aktiengesellschaft, Germany

[*] Notice: The term of this patent shall not extend beyond the expiration date of Pat. No. 5,132,381.

[21] Appl. No.: 427,499

[22] Filed: Apr. 24, 1995

Related U.S. Application Data

[63] Continuation of Ser. No. 203,514, Feb. 28, 1994, abandoned, which is a continuation of Ser. No. 996,868, Dec. 16, 1992, abandoned, which is a continuation of Ser. No. 630,263, Dec. 19, 1990, abandoned.

[30] Foreign Application Priority Data

Dec. 21, 1989 [DE] Germany ................. 39 42 366.2

[51] Int. Cl.$^6$ .................. C08F 4/42; C08F 4/64
[52] U.S. Cl. ............. 526/127; 526/160; 526/943; 502/152
[58] Field of Search ................. 526/127, 160, 526/943

[56] References Cited

U.S. PATENT DOCUMENTS 4,892,851  1/1990  Ewen et al. ............... 526/160
5,086,134  2/1992  Antberg et al. ............ 526/126
5,132,381  7/1992  Winter et al. ............. 526/160

FOREIGN PATENT DOCUMENTS 302424    8/1987   European Pat. Off. .
0387691   9/1990   European Pat. Off. .
0395055   10/1990  European Pat. Off. .
0426645   5/1991   European Pat. Off. .

OTHER PUBLICATIONS

Ewen, J.A. et al., *J. Am. Chem. Soc.* 110:6255–6256 (1988).

*Primary Examiner*—David W. Wu
*Attorney, Agent, or Firm*—Connolly & Hutz

[57] ABSTRACT

A syndiotactic propylene copolymer is obtained in high yields by copolymerization of propylene with small amounts of other olefins in the presence of a catalyst comprising a metallocene of the formula I

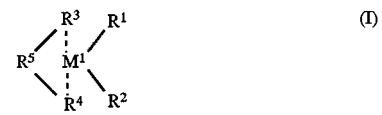

in which $M^1$ is titanium, zirconium, hafnium, vanadium, niobium or tantalum and an aluminoxane. This copolymer has a very high molecular weight, a very narrow molecular weight distribution, very high syndiotaxicity, advantageously low melting points and rubber-like behavior. Molded articles produced from the polymer are distinguished by high transparency, flexibility and tear strength. Their main areas of application are packagings of any type.

7 Claims, No Drawings

PROCESS FOR THE PREPARATION OF A SYNDIOTACTIC PROPYLENE COPOLYMER

This application is a continuation of 08/203,514 filed Feb. 28, 1994, now abandoned, which was a continuation of 07/996,868 filed Dec. 16, 1992, now abandoned, which was a continuation of application Ser. No. 07/630,263 filed Dec. 19, 1990, now abandoned.

DESCRIPTION

Syndiotactic polyolefins have good transparency, flexibility and tear strength.

For packagings, fill applications, hot-melt applications and surface coatings but also for highly flexible transparent molded articles, an even higher transparency and flexibility are important. Furthermore, for many applications, for example for coatings, lower melting points are desirable.

The object will be achieved by copolymerization of propylene with at least one further olefin in the presence of a metallocene and an aluminoxane.

Accordingly, the invention relates to a process for the preparation of a syndiotactic propylene copolymer comprising 99.9 to 50% by weight, relative to the entire polymer, of propylene units and 0.1 to 50% by weight, relative to the entire polymer, of units derived from ethylene or an olefin having at least 4 carbon atoms of the formula $R^a$—CH=CH—$R^b$, in which $R^a$ and $R^b$ are identical or different and are a hydrogen atom or an alkyl radical having 1 to 20 carbon atoms or $R^a$ and $R^b$ together with the carbon atoms linking them form a ring of 4 to 10 carbon atoms, by polymerization of 50 to 99.5% by weight, relative to the total amount of the monomers, of propylene and 0.5 to 50% by weight, relative to the total amount of the monomers, of at least one representative from the group comprising ethylene and olefins having at least 4 carbon atoms of the formula $R^a$—CH=CH—$R^b$, in which $R^a$ and $R^b$ have the above-mentioned meaning, at a temperature of −40° C. to 150° C. and a pressure of 0.5 to 100 bar in solution, in suspension or in the gas phase, in the presence of a catalyst which comprises a metallocene as the transition metal component and an aluminoxane of the formula II

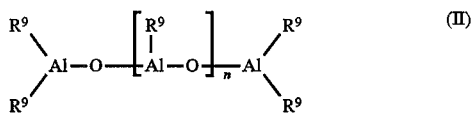

for the linear type and/or the formula III

for the cyclic type, $R^9$ in formulae II and III being a $C_1$–$C_6$-alkyl group or phenyl or benzyl and n an integer from 2 to 50, which comprises carrying out the polymerization in the presence of a catalyst whose transition metal component is a compound of the formula I

in which $M^1$ is titanium, zirconlure, hafnium, vanadium, niobium or tantalum, $R^1$ and $R^2$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, $R^3$ and $R^4$ are different and are a mono- or polynuclear hydrocarbon radical which together with the central atom $M^1$ can form a sandwich structure, $R^5$ is

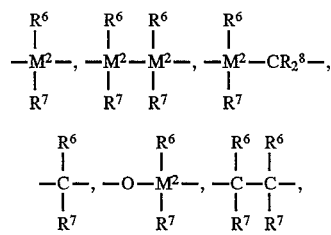

=$BR^6$, =$AlR^6$, —Ge—, —Sn—, —O—, —S—, =SO, =$SO_2$, =$NR^6$, =CO, =$PR^6$ or =$P(O)R^6$ in which $R^6$, $R^7$ and $R^8$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or $R^6$ and $R^7$ or $R^6$ and $R^8$ in each case together with the atoms linking them form a ring, and $M^2$ is silicon, germanium or tin.

The catalyst to be used for the process according to the invention comprises an aluminoxane and a metal-locene of the formula I

In Formula I, $M^1$ is a metal from the group comprising titanium, zirconium, hafnium, vanadium, niobium and tantalum, preferably zirconium and hafnium.

$R^1$ and $R^2$ are identical or different and are a hydrogen atom, a $C_1$–$C_{10}$-alkyl group, preferably a $C_1$–$C_3$-alkyl group, a $C_1$–$C_{10}$-alkoxy group, preferably a $C_1$–$C_3$alkoxy group, a $C_6$–$C_{10}$-aryl group, preferably a $C_6$–$C_8$-aryl group, a $C_6$–$C_{10}$-aryloxy group, preferably a $C_6$–$C_8$-aryloxy group, a $C_2$–$C_{10}$-alkenyl group, preferably a $C_2$–$C_4$-alkenyl group, a $C_7$–$C_{40}$-arylalkyl group, preferably a $C_7$–$C_{10}$-arylalkyl group, a $C_7$–$C_{40}$-alkylaryl group, preferably a $C_7$–$C_{12}$-alkylaryl group, a $C_8$–$C_{40}$-arylalkenyl group, preferably a $C_8$–$C_{12}$-arylalkenyl group or a halogen atom, preferably chlorine.

$R^3$ and $R^4$ are different and are a mono- or polynuclear hydrocarbon radical which together with the central atom $M^1$ can form a sandwich structure.

$R^3$ and $R^4$ are preferably fluorenyl and cyclopentadienyl, it being possible for the parent structures to carry additional substituents.

$R^5$ is a one- or multi-membered bridge linking the radicals $R^3$ and $R^4$ and is

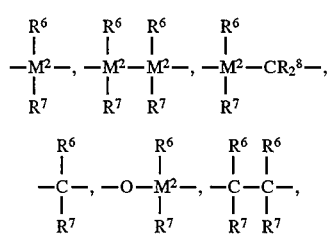

=BR$^6$, =AlR$^6$, —Ge—, —Sn—, —O—, —S—, =SO, =SO$_2$, =NR$^6$, =CO, =PR$^6$ or =P(O)R$^6$, in which R$^6$, R$^7$ and R$^8$ are identical or different and are a hydrogen atom, a halogen atom, preferably chlorine, a C$_1$–C$_{10}$-alkyl group, preferably a C$_1$–C$_3$-alkyl group, in particular a methyl group, a C$_1$–C$_{10}$-fluoroalkyl group, preferably a CF$_3$ a group, a C$_6$–C$_{10}$-fluoroaryl group, preferably a pentafluorophenyl group, a C$_6$–C$_{10}$-aryl group, preferably a C$_6$–C$_8$-aryl group, a C$_1$14 C$_{10}$-alkoxy group, preferably a C$_1$–C$_4$-alkoxy group, in particular a methoxy group, a C$_2$–C$_{10}$-alkenyl group, preferably a C$_2$–C$_4$-alkenyl group, a C$_7$–C$_{40}$-arylalkyl group, preferably a C$_7$–C$_{10}$-arylalkyl group, a C$_8$–C$_{40}$-arylalkenyl group, preferably a C$_8$–C$_{12}$-arylalkenyl group or a C$_7$–C$_{40}$-alkylaryl group, preferably a C$_7$–C$_{12}$-alkylaryl group, or R$^6$ and R$^7$ or R$^6$ and R$^8$ in each case together with the atoms linking them form a ring.

M$^2$ is silicon, germanium or tin, preferably silicon or germanium.

R$^5$ is preferably =CR$^6$R$^7$, =SiR$^6$R$^7$, =GeR$^6$R$^7$, —O—, —S—, =SO, =PR$^6$ or =P(O)R$^6$.

The metallocenes described can be prepared by the following general reaction scheme:

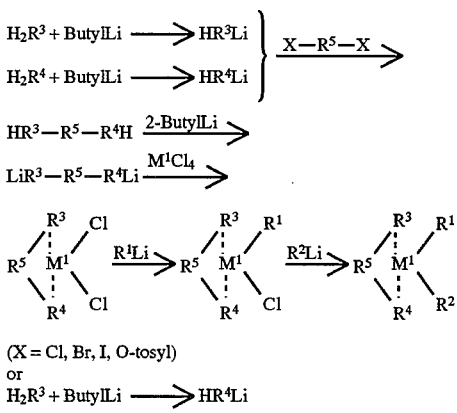

(X = Cl, Br, I, O-tosyl)
or
H$_2$R$^3$ + ButylLi ⟶ HR$^4$Li

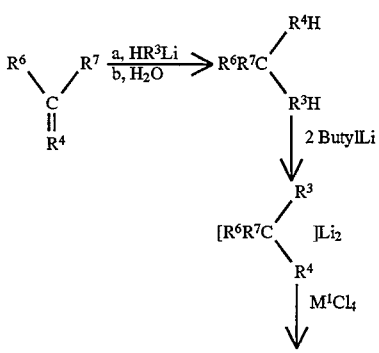

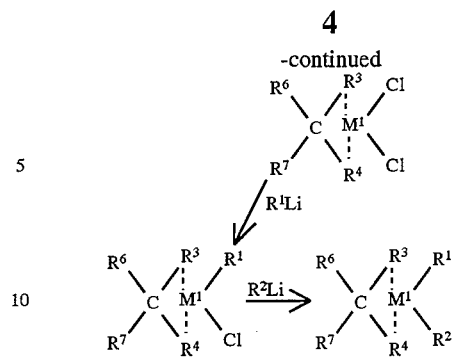

Metallocenes which are preferably used are (arylalkylidene) (9-fluorenyl)(cyclopentadienyl)zirconium dichloride, (diarylmethylene)(9-fluorenyl) (cyclopentadienyl)zirconium dichloride and (dialkylmethylene)(9-fluorenyl)-(cyclopentadienyl) zirconium dichloride.

Of these, (methyl(phenyl)methylene)(9-fluorenyl) (cyclopentadienyl) zirconium dichloride and (diphenylmethylene )-(9-fluorenyl)(cyclopentadienyl) zirconium dichloride and (dimethylmethylene)(9-(fluorenyl)(cyclopentadienyl)zirconium chloride and the corresponding hafnium analogs are particularly preferred.

The cocatalyst is an aluminoxane of the formula II

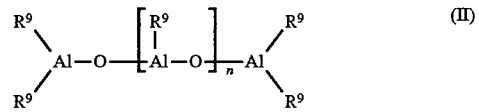 (II)

for the linear type and/or the formula III

 (III)

for the cyclic type. In these formulae, R$^9$ is a C$_1$–C$_6$-alkyl group, preferably methyl, ethyl or isobutyl, butyl or neopentyl, or phenyl or benzyl. Methyl is particularly preferred. n is an integer from 2 to 50, preferably 5 to 40. However, the exact structure of the aluminoxane is not known.

The aluminoxane can be prepared in different ways.

One possibility is to carefully add water to a dilute solution of a trialkylaluminum by adding the solution of the trialkylaluminum, preferably trimethylaluminum, and the water each in small portions to a previously introduced fairly large amount of an inert solvent and waiting after each addition until the evolution of gas has ceased.

In a different process, finely powdered copper sulfate pentahydrate is suspended in toluene, and trialkylaluminum is added under an inert gas at about −20° C. in such an amount that for every 4 aluminum atoms about 1 molecule of CuSo$_4$·5H$_2$O is available. After slow hydrolysis with the elimination of alkane, the reaction mixture is left at room temperature for 24 to 48 hours, during which it may have to be cooled to prevent the temperature from rising above 30° C. The copper sulfate is then filtered off from the aluminoxane dissolved in toluene, and the solution is concentrated in vacuo. It is assumed that in this preparation process the low-molecular-weight aluminoxanes condense to give higher oligomers with the elimination of trialkylaluminum.

Aluminoxanes are also obtained by reacting trialkylaluminum, preferably trimethylaluminum, dissolved in an inert aliphatic or aromatic solvent, preferably heptane or toluene, with hydrated aluminum salts, preferably aluminum sulfate. The volume ratio of the solvent to the alkylaluminum used is 1:1 to 50:1—preferably 5:1—and the reaction time, which can be controlled by the elimination of the alkane, is 1 to 200 hours—preferably 10 to 40 hours.

Of the hydrated aluminum salts, in particular those are used which have a high content of bound water. Aluminum sulfate hydrate is particularly preferred, in particular the compounds $Al_2(SO_4)_3 \cdot 16H_2O$ and $Al_2(SO_4)_3 \cdot 18H_2O$ having a particularly high bound water content of 16 and 18 mol of $H_2O$ mol of $Al_2(SO_4)_3$.

A further variation for preparing aluminoxanes consists in dissolving trialkylaluminum, preferably trimethylaluminum, in the suspending agent initially introduced into the polymerization boiler, preferably in the liquid monomer, in heptane or toluene, and then reacting the aluminum compound with water.

Apart from the process for the preparation of aluminoxanes described above, there are further useful ones. Irrespective of the preparation method, all aluminoxane solutions have a varying content of unconverted trialkylaluminum, which is present in free form or as an adduct, in common. This content has a not yet clarified effect on the catalytic efficiency which differs, depending on the metallocene compound used.

It is possible to preactivate the metallocene before using it in the polymerization reaction with an aluminoxane of the formula II and/or III. This substantially increases the polymerization activity and improves the grain morphology.

The preactivation of the transition metal compound is carried out in solution. Prefeably, the metallocene is dissolved in a solution of the aluminoxane in an inert hydrocarbon. Suitable inert hydrocarbons are aliphatic or aromatic hydrocarbons. Preferably, toluene is used.

The concentration of the aluminoxane in the solution is in the range of about 1% by weight up to the saturation limit, preferably 5 to 30% by weight, in each case relative to the entire solution. The metallocene can be used in the same concentration, but preferably it is used in an amount of $10^{-4}$–1 mol per mol of aluminoxane. The preactivation time is 5 minutes to 60 hours, preferably 5 to 60 minutes. The temperature used is $-78°$ C. to $100°$ C., preferably $0°$ to $70°$ C.

A considerably longer preactivation is possible, but it has usually neither an activity-increasing nor an activity-decreasing effect, but can be quite a good idea for reasons of storage.

The polymerization is carried out in a known manner in solution, in suspension or in the gas phase, continuously or batchwise, in one or several steps at a temperature of $-40°$ to $150°$ C., preferably $-30°$ to $100°$ C., in particular $0°$ to $80°$ C.

The polymerization is carried out with propylene and at least one representative from the group comprising ethylene and olefins having at least 4 carbon atoms of the formula $R^aCH=CHR^b$, in which $R^a$ and $R^b$ are identical or different and are a hydrogen atom or an alkyl radical having 1 to 20 carbon atoms, in which $R^a$ and $R^b$ together with the carbon atoms linking them can form a ring of 4 to 10 carbon atoms. Examples of olefins of this type are ethylene, 1-butene, 1-hexene, 4-methyl-1-pentene, 1-octene, norbornene or norbornadiene. Ethylene, 1-butene and 4-methyl-1-pentene are preferred.

The total pressure in the polymerization system is 0.5 to 100 bar. The polymerization in the industrially particularly useful pressure range of 5 to 60 bar is preferred.

A maximum of 50% by weight, preferably 0.5 to 20% by weight, in particular 0.5 to 10% by weight, of the comonomer(s) are incorporated in the polymer. Accordingly, the amounts used are 50 to 99.9, preferably 80 to 99.5,% by weight of propylene and 0.1 to 50, preferably 0.5 to 20,% by weight of the comohomer(s).

Hydrogen can be used as molecular weight regulator.

The metallocene compound is used in a concentration, relative to the transition metal, of $10^{-3}$ to $10^{-7}$, preferably $10^{-4}$ to $10^{-6}$, mol of transition metal per $dm^3$ of solvent or per $dm^3$ of reactor volume. The aluminoxane is used in a concentration of $10^{-5}$ to $10^{-1}$ mol, preferably $10^{-5}$ to $10^{-2}$ mol, per $dm^3$ of solvent or per $dm^3$ of reactor volume. However, high concentrations are in principle also possible.

If the polymerization is carried out as suspension or solution polymerization, an inert solvent customary for the Ziegler low-pressure process is used. For example, the polymerization is carried out in an aliphatic or cycloaliphatic hydrocarbon; examples of a hydrocarbon of this type is butane, pentane, hexane, heptane, isooctane, cyclohexane, methylcyclohexane.

Furthermore, it is possible to use a benzine or hydrogenated diesel oil fraction. Toluene is also usable. The polymerization is preferably carried out in the liquid monomer or in the gas phase.

If inert solvents are used, the monomers are metered into the reactor as a gas or a liquid. If a monomer is used as a suspending agent, the comonomer or comohomers are metered in as a gas or a liquid. Furthermore, it is possible to polymerize in a mixture of different monomers as suspending agent, and a further monomer can then be metered in as a liquid or a gas.

The polymerization time is as desired, since the catalyst system to be used according to the invention shows only a slight time-dependent decay of the polymerization activity.

The process according to the invention makes it possible to prepare chemically highly uniform copolymers. They can be processed in extruders, kneaders or other apparatuses used by the prior art to give plastic molded articles which are distinguished by high transparency, rubber-like behavior, high flexibility and advantageously low melting points.

The examples which follow are intended to illustrate the invention.

The properties of the polymers prepared according to the examples which follow were determined by the following individual methods.

The melt index was measured according to DIN 53 735 and given in $dg \cdot min^{-1}$.

The viscosity number VN of the polymers was determined in 0.1% strength by weight solutions in decahydronaphthalene (mixture of isomers) at $135°$ C. in a capillary viscometer and given in $cm^3/g$.

The ball indentation hardness was measured analogously to DIN 53 456 on pressed sheets which had been tempered at $120°$ C. under $N_2$ and cooled over a period of 3 h and stored in an air conditioning cabinet at $23°$ C. and 50% relative humidity for 24 hours for temperature equilibration.

To determine the mechanical properties, the impact bending test was carried out, using a standard small test bar with V notch (flank angle 45°, notch depth 1.3 mm, notch radius 1 mm). The test specimens were obtained from pressed sheets which had been stored after manufacture at $20°$ C. and 50% of relative humidity for 24 hours.

$M_w$=average molecular weight in g/mol $M_w/M_n$= polydispersity

The molecular weights were determined by gel permeation chromatography.

The composition of the product was determined by $^{13}C$ NMR spectroscopy, in which the symbols have the following meanings:

$\bar{n}_{PP}$ average block length polypropylene
$\bar{n}_{PE}$ average block length polyethylene
$\bar{n}_{syn}$ average syndiotactic block length
SI syndiotactic index (SI=rr+½ mr)

Melting points (m.p.), crystallization points (cr.p.) and glass-transition temperatures ($T_g$) were determined by DSC measurements (heating rate 20° C./min, cooling rate 5° C./min).

All operations which follow of metallocene syntheses were carried out under an inert gas atmosphere using dehydrated solvent.

Diphenylenemethylene(9-fluorenyl)(cyclopentadienyl) zirconium dichloride

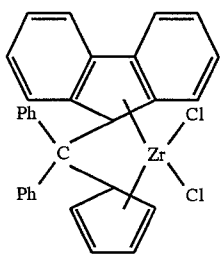

12.3 cm³(30.7 mmol) of a 2.5 molar hexane solution of n-butyllithium were slowly added to a solution of 5.10 g (30.7 mmol) of fluorene in 60 cm³ of THF at room temperature. After 40 minutes, 7.07 g (30.7 mmol) of diphenylfulvene were added to the orange solution, and the mixture was stirred overnight. 60 cm³ of water were added to the dark red solution, as a result of which the solution turns yellow, and the solution was extracted with ether. The ether phase was dried over $MgSO_4$, concentrated, and allowed to crystallize at −35° C. 5.1 g (42%) of 1,1-cyclopentadienyl-(9-fluorenyl)diphenylmethane was obtained as a beige powder.

2.0 g (5.0 mmol) of the compound were dissolved in 20 cm³ of THF, and 6.4 cm³ (10 mmol) of a 1.6 molar solution of butyllithium in hexane were added at 0° C. After stirring at room temperature for 15 minutes, the solvent was evaporated, the red residue was dried at an oil pump vacuum and washed several times with hexane. After drying at an oil pump vacuum, the red powder was added at −78° C. to a suspension of 1.16 g (5.00 mmol) of $ZrCl_4$. The mixture was slowly warmed and then stirred at room temperature for another 2 hours. The pink suspension was filtered through a G3 sintered-glass crucible. The pink residue was washed with 20 cm³ of $CH_2Cl_2$, dried at an oil pump vacuum and extracted with 120 cm³ of toluene. The solvent was evaporated, and drying at an oil pump vacuum gave 0.55 g of the zirconium complex in the form of a pink crystal powder.

The orange-red filtrate of the reaction mixture was concentrated and allowed to crystallize at −35° C. Another 0.45 g of the complex crystallizes from $CH_2Cl_2$. Total yield 1.0 g (36%). Correct elemental analyses. The mass spectrum showed an $M^+$ of 556. $^1H$ NMR spectrum (100 MHz, $CDCl_3$); 6.90–8.25 (m, 16, Flu-H, Ph-H), 6.40 (m, 2, Ph-H), 6.37 (t, 2, Cp-H), 5.80 (t, 2, Cp-H).

The metallocene (dimethylmethylene)(9-fluorenyl)(cyclopentadienyl )zirconium dichloride was prepared analogously to the literature reference J. Am. Chem. Soc. 110 (1988) 6255.

(Phenyl)(methyl)(methylene)(9-fluorenyl)(cyclopentadienyl) hafnium dichloride

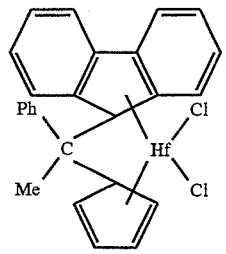

A solution of 67.8 mmol of fluorenyllithium in 50 cm³ of THF was added at room temperature to a solution of 11.4 g (67.8 mmol) of 6-methyl-6-phenylfulvene in 40 cm³ of THF. After stirring at room temperature for 2 hours, 60 cm³ of water were added. The resulting precipitated substance was filtered off with suction, washed with diethyl ether and dried at an oil pump vacuum. 19.1 g (84.2%) of 2,2-cyclopentadienyl(9-fluorenyl)ethylbenzene (correct elemental analyses; $^1H$-NMR spectrum) were obtained.

10.0 g (19.9 mmol) of the compound were dissolved in 60 cm³ of THF, and 26 cm³ (65 mmol) of a 2.5 molar hexane solution of n-butyllithium were added at 0° C. After stirring for 15 minutes, the solvent was evaporated in vacuo. The remaining dark-red residue was washed several times with hexane and dried at an oil pump vacuum. 15.6 g of the red dilithio salt were obtained in the form of the THF adduct which contained about 30% of THF.

A suspension of 4.78 g (14.9 mmol) of $HfCl_4$ in 70 cm³ of $CH_2Cl_2$ was reacted with 14.9 mmol of the dilithio salt and worked up. The crystallization at −35° C. gave 2.6 g (30%) of the hafnocene dichloride compound as crystals. Correct elemental analysis. $^1H$-NMR spectrum (100 MHz, $CDCl_3$): 7.17–8.20 (m, 11, Flu-H, Ph-H), 6.87 (m, 1, Ph-H), 6.12–6.42 (m, 3, Ph-H, CpH), 5.82, 5.67 (2xdd, 2x1, Cp-H), 2.52 (s, 3, $CH_3$).

EXAMPLE 1

A dry 16 dm³ reactor was flushed with nitrogen and filled with 10 dm³ of liquid propylene. 30 cm³ of a methylaluminoxane solution in toluene (corresponding to 40 mmol of Al, average oligomerization degree of the methylaluminoxane 20), and the mixture was stirred at 30° C. for 15 minutes.

In parallel, 17.6 mg (0.04 mmol) of (dimethyimethylene)-( 9-fluorenyl)(cyclopentadienyl) zirconium dichloride were dissolved in 15 cm³ of methylaluminoxane solution in toluene (20 mmol of Al), preactivated by letting it stand for 15 minutes and then poured into the boiler.

The polymerization system was brought to 60° C., and 18 g of ethylene were uniformly metered in during the polymerization period of 30 minutes. 1.44 kg of a polymer powder having an MFI 230/5 of 49 dg·min⁻¹ were obtained. The amount of ethylene incorporated was 1.2% by weight. Block length: $\bar{n}_{PP}$=58, $\bar{n}_{PE}$~1, $\bar{n}_{syn}$=24; VN=122 cm³/g; $M_w$=96,900 g/mol, $M_w/M_n$=2.2; m.p. =128° C., cr.p.=71° C., $T_g$=−0.3° C.; ball indentation hardness 31 $Nmm^{-2}$; notch impact strength at 0° C. 6.1 $mJmm^{-2}$, at −20° C. 4.3 $mJmm^{-2}$; no fracture at +23° C.

COMPARATIVE EXAMPLE A

A syndiotactic homopolymer polymerized under comparable polymerization conditions but without using ethylene had a $T_g$ of 1.5° C., an m.p. of 134° C. and a cr.p. of 88° C. Notch impact strength at 0° C. 2.0 $mJmm^{-2}$, at 23° C. 15.1 $mJmm^{-2}$.

EXAMPLE 2

The procedure of Example 1 was repeated, except that 37.9 mg (0.065 mmol) of (phenyl(methyl)methylene)(9-fluorenyl)(cyclopentadienyl) hafnium dichloride were used and 37.5 g of ethylene were metered in uniformly during the three hours of polymerization. 0.8 kg of polymer powder having an MFI 230/5 of 0.4 dg·min$^{-1}$ was obtained. The amount of ethylene incorporated was 1.3% by weight. Block length: $\bar{n}_{PP}$=53, $\bar{n}_{PE}$~1, $\bar{n}_{syn}$=22; VN=655 cm$^3$/g; $M_w$=807,000 g/mol, $M_w/M_n$=2.2; m.p.=105° C., cr.p.=55° C., $T_g$=1.6° C. Notch impact strength: no fracture at +23° C., 6.7 mJmm$^{-2}$ at 0° C.

COMPARATIVE EXAMPLE B

A syndiotactic homopolymer polymerized under comparable polymerization conditions but without using ethylene had a melting point of 120° C. Notch impact strength 12.7 mJmm$^{-2}$ at +23° C. and 2.0 mJmm$^{-2}$ at 0° C.

EXAMPLE 3

The procedure of Example 1 was repeated, except that 12.7 mg (0.023 mmol) of (diphenyimethylene)(9-fluorenyl)(cyclopentadienyl)zirconium dichloride were used. Before the metallocene was added to the polymerization system, 7.5 g of ethylene were introduced into the reactor. During the polymerization period of 60 minutes, another 30 g of ethylene were metered in uniformly. 1.0 kg of polymer powder was obtained. The amount of ethylene incorporated was 2.7% by weight. Block length: $\bar{n}_{PP}$=24, $\bar{n}_{PE}$~1, SI=94.9%; VN=365 cm$^3$/g; $M_w$=411,000 g/mol, $M_w/M_n$=2.8; m.p.=104° C., cr.p.=61° C., $T_g$=−4.3° C. Notch impact strength: no fracture at +23° C., 5.9 mJmm$^{-2}$ at 0° C. and 4.3 mJmm$^{-2}$ at −20° C.

EXAMPLE 4

The procedure of Example 1 was repeated, except that 10.8 mg (0.02 mmol) of (diphenylmethylene)(9-fluorenyl)-(cyclopentadienyl) zirconium dichloride were used and 7.5 g of ethylene were introduced into the reactor. During the polymerization period of 90 minutes, 37.5 g of ethylene were metered in uniformly.

1.20 kg of polymer powder having an MFI 230/5 of 0.3 dg·min$^{-1}$ were obtained. The amount of ethylene incorporated was 2.1% by weight. Block length: $\bar{n}_{PP}$=31.5, $\bar{n}_{PE}$~1, SI=95.2%; VN=415 cm$^3$/g; $M_w$=457,500 g/mol, $M_w/M_n$=2.6; m.p.=115° C., cr.p.=71° C., $T_g$=0.2° C.; ball indentation hardness 24 Nmm$^{-2}$; notch impact strength: 6.7 mJmm$^{-2}$ at 0° C. and 4.2 mJmm$^{-2}$ at −20° C. No fracture at +23° C.

COMPARATIVE EXAMPLE C

A syndiotactic homopolymer polymerized under comparable polymerization conditions but without using ethylene had a melting point of 136° C. and a $T_g$ of 5.2° C. The notch impact strength at 0° C. was only 1.2 mJmm$^{-2}$, at +23° C. 11.7 mJmm$^{-2}$.

EXAMPLE 5

The procedure of Example 1 was repeated, except that 10.8 mg. (0.02 mmol) of (diphenylmethylene)(9-fluorenyl)-(cyclopentadienyl) zirconium dichloride were used and during the polymerization period of 60 minutes at 70° C., 17.5 g of ethylene were metered in uniformly. 1.20 kg of polymer powder having an MFI 230/5 of 0.2 dg·min$^{-1}$ were obtained. The amount of ethylene incorporated was 0.75% by weight. Block length: $\bar{n}_{PP}$=89, $\bar{n}_{PE}$~1, SI=95 8%; VN=410 cm$^3$/g; $M_w$=491,500 g/mol, $M_w/M_n$=2.3; m.p.=124° C., cr.p.=83° C., $T_g$=2.6° C.; ball indentation hardness 26 Nmm$^{-2}$; notch impact strength: 5.0 mJmm$^{-2}$ at 0° C. and 4.2 mJmm$^{-2}$ at −20° C.; no fracture at +23° C.

EXAMPLE 6

The procedure of Example 5 was repeated, except that the polymerization temperature was 60° C. 0.65 kg of polymer powder having an MFI 230/5 of 0.3 dg·min$^{-1}$ were obtained. The amount of ethylene incorporated was 0.94% by weight. Block length: $\bar{n}_{PP}$=73, $\bar{n}_{PE}$~1, SI=95.5%; VN=445 cm$^3$/g; $M_w$=547,500, $M_w/M_n$=2.9; m.p.=128° C., cr.p.=88° C., $T_g$=3.1° C.; ball indentation hardness 27 Nmm$^{-2}$; notch impact strength: 6.9 mJmm$^{-2}$ at 0° C. and 4.3 mJmm$^{-2}$ at −20° C.; no fracture at +23° C.

EXAMPLE 7

The procedure of Example 5 was repeated, except that the amount of metallocene used was 21.6 mg (0.039 mmol) and the polymerization temperature was 50° C. 0.71 kg of polymer powder having an MFI 230/5 of 0.2 dg·min$^{-1}$ were obtained. The amount of ethylene incorporated was 1.1% by weight. Block length: $\bar{n}_{PP}$=60, $\bar{n}_{PE}$~1, SI=96.0%; VN =531 cm$^3$/g; $M_w$=634,000, $M_w/M_n$=2.8; m.p.=127° C., cr.p. =90° C., $T_g$=2.8° C.; ball indentation hardness 27 Nmm$^{-2}$; notch impact strength: 7.9 mJmm$^{-2}$ at 0° C. and 5.4 mJmm$^{-2}$ at −20° C.; no fracture at +23° C.

EXAMPLE 8

The procedure of Example 7 was repeated, except that additionally 25 Ndm$^3$ of hydrogen at the beginning of the polymerization were introduced into the reactor. 1.15 kg of polymer powder having an MFI 230/5 of 8.0 dg·min$^{-1}$ were obtained. The Mount of ethylene incorporated was 1.0% by weight. Block length: $\bar{n}_{PP}$=66, $\bar{n}_{PE}$~1, SI=97.1%; VN=286 cm$^3$/hg; $M_w$=418,000, $M_w/M_n$=2.1; m.p.=125° C., cr.p.=88° C., $T_g$=2.5° C.; ball indentation hardness 30 Nmm$^{-2}$; notch impact strength: 7.0 mJmm$^{-2}$ at 0° C. and 4.7 mJmm$^{-2}$ at −20° C.; no fracture at +23° C.

EXAMPLE 9

The procedure of Example 8 was repeated, except that the amount of ethylene used was 195 g and the polymerization time 2 h. 1.8 kg of polymer powder having an MFI 230/5 of 2 dg·min$^{-1}$ were obtained. The amount of ethylene incorporated was 9.9% by weight, block length: $\bar{n}_{PP}$=7.5, $\bar{n}_{PE}$=1.1, VN=595 cm$^3$/g; $M_w$=705,000, $M_w/M_n$=2.2; m.p. 95° C., cr.p.=60° C., $T_g$=−10.5° C. Notch impact strength at 0° C. 15.2 mJmm$_{-2}$; no fracture at +23° C.

We claim:

1. A process for the preparation of a syndiotactic propylene copolymer comprising 99.9 to 50% by weight, relative to the entire polymer, of propylene units and 0.1 to 50% by weight, relative to the entire polymer, of units derived from ethylene or an olefin having at least 4 carbon atoms of the formula R$^a$—CH=CH—R$^b$, in which R$^a$ and R$^b$ are identical or different and are a hydrogen atom or an alkyl radical having 1 to 20 carbon atoms or R$^a$ and R$^b$ together with the carbon atoms linking them form a ring of 4 to 10 carbon atoms, said process comprising polymerization of 50 to 99.5% by weight, relative to the total amount of the monomers, of propylene and 0.5 to 50% by weight, relative to the total amount of the monomers, of at least one representative from the group comprising ethylene and olefins having at least 4 carbon atoms of the formula $R^a$—CH=CH—$R^b$, in which $R^a$ and $R^b$ have the above mentioned meaning, at a temperature of –40° C. to 150° C. and a pressure of 0.5 to 100 bar in solution, in suspension or in the gas phase, in the presence of a catalyst which comprises a metallocene as the transition metal component and an aluminoxane of the formula II

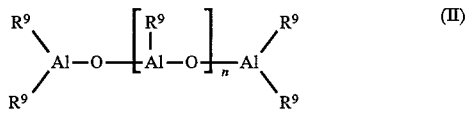

for the linear type and/or the formula III

for the cyclic type, $R^9$ in formulae II and III being a $C_1$–$C_6$-alkyl group or phenyl or benzyl and n an integer from 2 to 50, which comprises carrying out the polymerization in the presence of a catalyst whose transition metal component is a metallocene compound of the formula I

in which
$M^1$ is titanium, zirconium, hafnium, vanadium, niobium or tantalum,
$R^1$ and $R^2$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{10}$-arylalkyl group, a $C_7$–$C_{40}$-alkylaryl group or a $C_8$–$C_{40}$-arylalkenyl group,
$R^3$ and $R^4$ are different and are a mono- or polynuclear hydrocarbon radical which together with the central atom $M^1$ can form a sandwich structure,
$R^5$ is

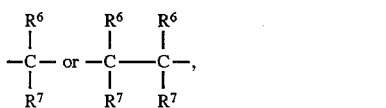

in which $R^6$ and $R^7$ are identical or different and $R^6$ is a $C_6$–$C_{10}$ aryl group and $R^7$ is a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or $R^6$ and $R^7$ in each case together with the atoms linking them form a ring.

2. A process for the preparation of a syndiotactic propylene copolymer comprising 99.9 to 50% by weight, relative to the entire polymer, of propylene units and 0.1 to 50% by weight, relative to the entire polymer, of units derived from ethylene or an olefin having at least 4 carbon atoms of the formula $R^a$—CH=CH—$R^b$, in which $R^a$ and $R^b$ are identical or different and are a hydrogen atom or an alkyl radical having 1 to 20 carbon atoms or $R^a$ and $R^b$ together with the carbon atoms linking them form a ring of 4 to 10 carbon atoms, said process comprising polymerization of 50 to 99.5% by weight, relative to the total amount of the monomers, of propylene and 0.5 to 50% by weight, relative to the total amount of the monomers, of at least one representative from the group comprising ethylene and olefins having at least 4 carbon atoms of the formula $R^a$—CH=CH—$R^b$, in which $R^a$ and $R^b$ have the above mentioned meaning, at a temperature of –40° C. to 150° C. and a pressure of 0.5 to 100 bar in solution, in suspension or in the gas phase, in the presence of a catalyst which comprises a metallocene as the transition metal component and an aluminoxane of the formula II

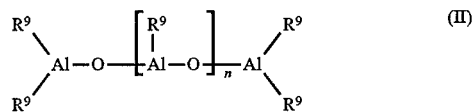

for the linear type and/or the formula III

for the cyclic type, $R^9$ in formulae II and III being a $C_1$–$C_6$-alkyl group or phenyl or benzyl and n an integer from 2 to 50, which comprises carrying out the polymerization in the presence of a catalyst whose transition metal component is a metallocene, wherein said metallocene compound is (arylalkylidene)(9-fluorenyl)(cyclopentadienyl) zirconium dichloride, (diarylmethylene)(9-fluorenyl)(cyclopentadienyl)zirconium dichloride or (dialkylmethylene)(9-fluorenyl)(cyclopentadienyl) zirconium dichloride or the corresponding hafnium analogs of said metallocene compounds.

3. A process for the preparation of a syndiotactic propylene copolymer comprising 99.9 to 50% by weight, relative to the entire polymer, of propylene units and 0.1 to 50% by weight, relative to the entire polymer, of units derived from ethylene or an olefin having at least 4 carbon atoms of the formula $R^a$—CH=CH—$R^b$, in which $R^a$ and $R^b$ are identical or different and are a hydrogen atom or an alkyl radical having 1 to 20 carbon atoms or $R^a$ and $R^b$ together with the carbon atoms linking them form a ring of 4 to 10 carbon atoms, said process comprising polymerization of 50 to 99.5% by weight, relative to the total amount of the monomers, of propylene and 0.5 to 50% by weight, relative to the total amount of the monomers, of at least one representative from the group comprising ethylene and olefins having at least 4 carbon atoms of the formula $R^a$—CH=CH—$R^b$, in which $R^a$ and $R^b$ have the above mentioned meaning, at a temperature of –40° C. to 150° C. and a pressure of 0.5 to 100 bar in solution, in suspension or in the gas phase, in the presence of a catalyst which comprises a metallocene as the transition metal component and an aluminoxane of the formula II

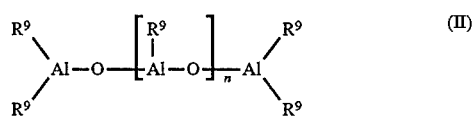

for the linear type and/or the formula III

for the cyclic type, $R^9$ in formulae II and III being a $C_1$–$C_6$-alkyl group or phenyl or benzyl and n an integer from 2 to 50, which comprises carrying out the polymerization in the presence of a catalyst whose transition metal component is a metallocene, wherein said metallocene compound is (methyl(phenyl)methylene)(9-fluorenyl)(cyclopentadienyl) zirconium dichloride, (diphenylmethylene)(9-fluorenyl)(cyclopentadienyl) zirconium dichloride, or (dimethylmethylene)(9-fluorenyl)(cyclopentadienyl) zirconium chloride or the corresponding hafnium analogs of said metallocene compounds.

4. The process as claimed in claim 1, wherein, in said formula (I), $R^3$ or $R^4$ is fluorenyl.

5. The process as claimed in claim 4, wherein, in said formula (I), $R^3$ and $R^4$ are fluorenyl and cyclopentadienyl.

6. The process as claimed in claim 4, wherein, in said formula (I), $M^1$ is zirconium or hafnium.

7. The process as claimed in claim 3, wherein said metallocene compound is (methyl(phenyl)methylene)(9-fluorenyl)(cyclopentadienyl) hafnium dichloride, (diphenylmethylene)(9-fluorenyl)(cyclopentadienyl) zirconium dichloride, or (dimethylmethylene)(9-fluorenyl)(cyclopentadienyl) zirconium dichloride.

* * * * *